(12) United States Patent
Sims et al.

(10) Patent No.: US 11,504,650 B2
(45) Date of Patent: Nov. 22, 2022

(54) FLUID DEGASSING SYSTEM WITH REDUCED PRESSURE PULSATILITY

(71) Applicant: IDEX Health & Science, LLC, Rohnert Park, CA (US)

(72) Inventors: Carl Sims, Durango, CO (US); Dan Leake, Sebastopol, CA (US); John Ruf, Rohnert Park, CA (US)

(73) Assignee: IDEX Health & Science LLC, Rohnert Park, CA (US)

( * ) Notice: Subject to any disclaimer, the term of this patent is extended or adjusted under 35 U.S.C. 154(b) by 156 days.

(21) Appl. No.: 17/028,171

(22) Filed: Sep. 22, 2020

(65) Prior Publication Data

US 2021/0086105 A1 Mar. 25, 2021

Related U.S. Application Data

(60) Provisional application No. 62/904,271, filed on Sep. 23, 2019.

(51) Int. Cl.
*B01D 19/00* (2006.01)

(52) U.S. Cl.
CPC ..... *B01D 19/0031* (2013.01); *B01D 19/0036* (2013.01); *B01D 19/0063* (2013.01)

(58) Field of Classification Search
None
See application file for complete search history.

(56) References Cited

U.S. PATENT DOCUMENTS

| | | |
|---|---|---|
| 5,183,486 A | 2/1993 | Gatten et al. |
| 5,205,844 A | 4/1993 | Morikawa |
| 5,340,384 A | 8/1994 | Sims |
| 5,743,941 A | 4/1998 | Gerner et al. |
| 6,248,157 B1 | 6/2001 | Sims et al. |
| 6,319,398 B1 | 11/2001 | Saitoh |
| 6,494,938 B2 | 12/2002 | Sims et al. |
| 6,596,058 B2 | 7/2003 | Gerner et al. |
| 6,755,899 B2 | 6/2004 | Nagai |
| 6,949,132 B2 | 9/2005 | Theielen et al. |
| 7,399,345 B2 | 7/2008 | Gerner |
| 7,686,590 B2 | 3/2010 | Ishii et al. |
| 7,947,112 B1 | 5/2011 | Gerner et al. |
| 8,017,016 B2 | 9/2011 | Sims et al. |
| 9,381,449 B2 | 6/2016 | Sims et al. |
| 9,403,121 B2 | 8/2016 | Sims et al. |
| 9,770,678 B2 | 9/2017 | Jackson et al. |
| 10,143,942 B2 | 12/2018 | Liu et al. |
| 2003/0010213 A1 | 1/2003 | Gerner et al. |
| 2005/0079074 A1* | 4/2005 | Ishii .................. G05D 16/2066 417/423.4 |
| 2007/0256561 A1 | 11/2007 | Ooya |
| 2008/0006578 A1* | 1/2008 | Sims ...................... G01N 30/28 210/639 |
| 2011/0211976 A1* | 9/2011 | Magoon .................... C02F 1/44 417/53 |

(Continued)

*Primary Examiner* — Christopher P Jones
*Assistant Examiner* — Phillip Y Shao
(74) *Attorney, Agent, or Firm* — Haugen Law Firm PLLP

(57) ABSTRACT

The pressure fluctuations in a fluid degassing system may be diminished by independently controlling the intake phase and the exhaust phase of an evacuation pump. The speed of the pump's drive element may be modulated at least during the intake phase to more closely align with a pressure set point in a degassing module.

25 Claims, 4 Drawing Sheets

(56) References Cited

U.S. PATENT DOCUMENTS

| | | | |
|---|---|---|---|
| 2012/0240770 A1* | 9/2012 | Gerner | B01D 61/362 96/6 |
| 2014/0260969 A1* | 9/2014 | Richardson | F04B 49/08 96/6 |
| 2016/0107101 A1 | 4/2016 | Reiter et al. | |
| 2016/0114264 A1* | 4/2016 | Liu | B01D 69/046 96/6 |
| 2017/0120164 A1* | 5/2017 | Chen | B01D 19/0063 |
| 2019/0091609 A1 | 3/2019 | Lui et al. | |

* cited by examiner

FLUID DEGASSING SYSTEM WITH REDUCED PRESSURE PULSATILITY

FIELD OF THE INVENTION

The present invention relates to fluid degassing systems generally, and more particularly to methods and apparatus for improving performance and consistency of vacuum degassing systems, particularly in low evacuation demand applications or operational phases. The present invention is specifically directed to controlled evacuation of a fluid degassing chamber, such as that which may be utilized in fluid analysis systems.

BACKGROUND OF THE INVENTION

Fluid degassing systems are employed in a variety of applications in which the presence of one or more gaseous species in a fluid is undesirable. A particular example of such an application involves the liquid mobile phase in liquid chromatography, wherein the presence of even small amounts of dissolved gasses can interfere with the accuracy and sensitivity of the fluid analysis. For example, air dissolved in the liquid mobile phase can manifest itself in the form of bubbles which may cause detector noise and drift. Unwanted gaseous species are typically removed from such a liquid mobile phase by a degassing process.

Membrane separations are commonly used in chromatography applications for degassing the liquid mobile phase. Vacuum degassing refers to a process in which a semi-permeable membrane defines a retentate side and a permeate side, with the fluid to be degassed contacting the retentate side of the membrane, and the permeate side being maintained at a reduced pressure. In the case of liquid chromatography applications, a first (retentate) side of an inert, gas permeable membrane is in contact with a mobile phase comprised of a solvent, or a mixture of solvents, while the opposite, second (permeate) side of the membrane is in contact with a gas that may be at reduced atmospheric pressure. The function of the membrane is to allow diffusion of atmospheric gas dissolved in mobile phase into the permeate side of the membrane in a manner consistent with Henry's law and Dalton's law, wherein the membrane itself behaves according to Fick's law of diffusion. Of particular interest in the field of chromatographic mobile phase degassing is the role of the membrane in selectively allowing atmospheric fixed gasses such as oxygen, nitrogen, and carbon dioxide which may be dissolved in the mobile phase to pass through the membrane while restricting the movement of the desired liquid components of the mobile phase from passing through the membrane. Such restriction of movement is commonly referred to as the selectivity of the membrane. It is therefore desirable to select a membrane material which allows the passage of these fixed gasses to the exclusion of the liquid components of the mobile phase.

Vacuum degassing systems typically include a degassing module with a housing defining a chamber that is separated into a retentate side and a permeate side by the separation membrane. The housing includes a port through which a vacuum source may be fluidically connected to the permeate side of the chamber for evacuation thereof. A vacuum pump is an example vacuum source, wherein the vacuum pump may be operated by a control system to evacuate the permeate side of the chamber to a desired extent, such as a set point pressure. Example vacuum degassing systems are described in U.S. Pat. Nos. 6,248,157 and 6,494,938, herein incorporated by reference.

Conventional vacuum degassing systems for high pressure liquid chromatography applications typically operate at permeate side pressures of between about 50-120 mm Hg. Certain HPLC mobile phase degassing applications, however, may more desirably be performed at higher permeate side pressure levels, such as about 200 mm Hg. Conventional vacuum pump control programs can produce substantial permeate side pressure fluctuations, even when set to maintain a pressure set point. Such pressure fluctuations have traditionally had a relatively small impact on degassing performance and consistency due to relatively large chamber volumes, separation membrane thicknesses, and fluid mass flow rates through the retentate side of the chamber. With the advent of relatively low-volume chambers in flat-film degassing modules, such as that described in U.S. Pat. No. 10,143,942, herein incorporated by reference, as well as decreased membrane thickness and decreased fluid mass flow rates, pressure fluctuations at the permeate side of the degassing chamber becomes more apparent in baseline noise in analytical detection systems. Fluctuations in permeate side pressure yield inconsistent degassing performance.

It is therefore an object of the present invention to provide a fluid degassing system that is controlled in a manner to substantially reduce permeate side pressure fluctuation, including in relatively low-volume chambers.

It is another object of the present invention to dynamically ascertain position characteristics of moving elements of a vacuum pump in a vacuum degassing system that precisely correspond to the intake phase and the exhaust phase of the pump. Speed control of such moving parts may therefore correlate to the position of the moving parts.

It is a further object of the invention to enhance the stability of vacuum control in a vacuum degassing chamber with a vacuum pump operating at less than maximum output.

SUMMARY OF THE INVENTION

By means of the present invention, fluid degassing performance may be enhanced by reducing pressure fluctuations in the vacuum degassing module. Set point pressures may be more tightly adhered to through a vacuum degassing control system as described herein. In particular, operational speed of a vacuum pump is modulated within each pumping cycle to most closely meet the evacuation demand for maintaining set point pressure within the degassing chamber.

In one embodiment of the invention, a method for degassing a fluid includes providing a degassing system with a module defining a chamber having a fluid inlet, a fluid outlet, and an evacuation port. A gas-permeable, liquid-impermeable membrane is disposed in and separates the chamber into a permeate side and a retentate side, and a pump is fluidically connected to the evacuation port for evacuating the permeate side of the chamber. The pump includes a motor with a drive element that drives an intake phase and an exhaust phase of the pump. The method includes contacting the membrane with the fluid at the retentate side of the chamber, and controlling the pump in a first condition to evacuate the permeate side of the chamber to maintain a first set point pressure by modulating a speed of the drive element according to a control algorithm including:

$$S_i/S_e<1$$

Wherein:

$S_i$=a drive element average speed during the intake phase; and $S_e$=a drive element average speed during the exhaust phase.

In another embodiment, a method for degassing a fluid includes controlling the pump in a first condition to evacuate the permeate side of the chamber to maintain a first set point pressure by modulating a speed of the drive element according to a PID control scheme only during the intake phase. In some embodiments, the speed of the drive element may be adjusted to operate at a constant rate in the exhaust phase.

The methods of the present invention may be incorporated into a fluid degassing system including a chamber with a fluid inlet, a fluid outlet, and an evacuation port, and a gas-permeable, liquid-impermeable membrane disposed in the chamber and separating the chamber into a permeate side and a retentate side. The system further includes a pump that is fluidically connected to the evacuation port for evacuating the permeate side of the chamber. The pump includes a motor with a drive element that drives an intake phase and an exhaust phase of the pump. The degassing system preferably utilizes a control system for operating the pump in response to a sensed condition and an input parameter to control a pressure at the permeate side of the chamber. The control system is adapted to modulate a speed of the drive element according to a control algorithm including:

$$S_i/S_e<1$$

Wherein:

$S_i$=a drive element average speed during the intake phase; and $S_e$=a drive element average speed during the exhaust phase.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible embodiments of the invention. Other embodiments and aspects of the invention are recognized as being within the grasp of those having ordinary skill in the art.

Figure 1:
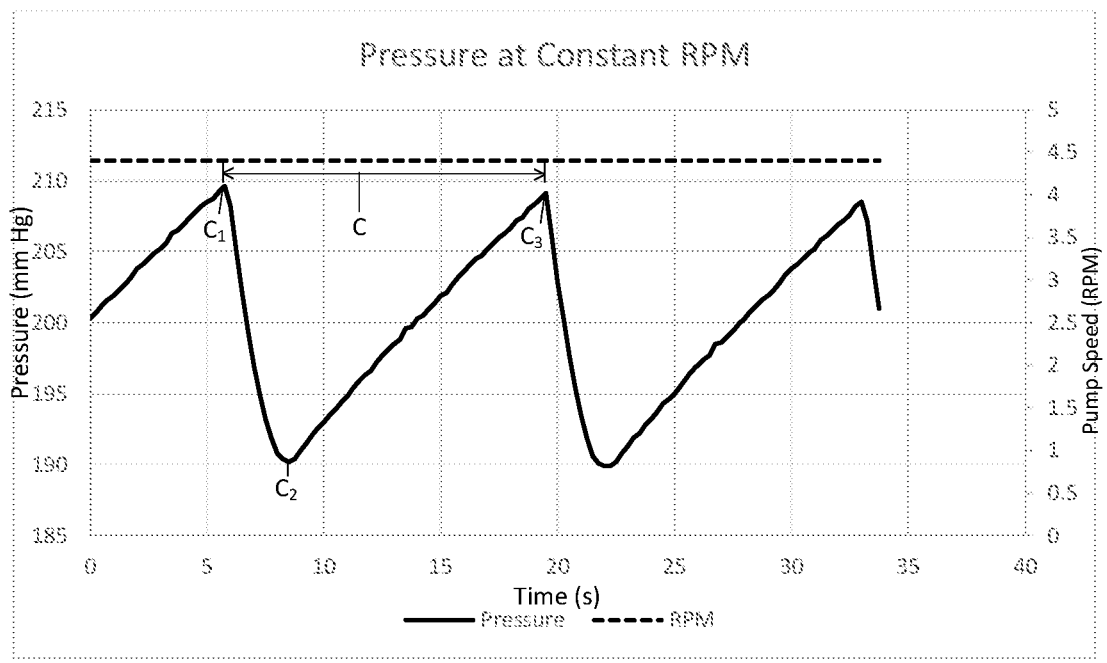
FIG. 1 is a chart illustrating pressure fluctuations as a result of a conventional constant speed evacuation pump control.

Conventional approaches to vacuum pump control include an example scheme in which the pump is initially operated at high speed to evacuate the degassing chamber toward a pressure set point. As the pressure inside the degassing chamber begins to approach the set point, the vacuum pump speed is substantially reduced and run continuously at such reduced rate. Ideally, the degassing chamber pressure remains constant while the vacuum pump is operated continuously at the reduced rate. However, as described above, it has been found that pressure fluctuation occurs even with the vacuum pump operated at a constant rate, due to the intake/exhaust cycle of the vacuum pump. FIG. 1 is a chart that illustrates how degassing chamber pressure varies with a constant-speed vacuum pump. A cycle "C" of the pump is shown in the chart, and represents one complete intake phase and complete exhaust phase of the pump. In the illustrated example, the vacuum pump is operated at a constant speed of approximately 212 rpm. The initial point of cycle "C" is denoted by "$C_1$", which is the beginning of the intake phase of the pump during which time the pump actively evacuates the degassing chamber. The pressure within the degassing chamber correspondingly drops from about 210 mm Hg to about 190 mm Hg. Point "$C_2$" on the chart indicates the end of the intake phase and the beginning of the exhaust phase of the vacuum pump in which gasses collected by the pump during the intake phase are exhausted to atmosphere. Since the pump does not actively evacuate the degassing chamber during the exhaust phase, gasses entering the permeate side of the chamber through the membrane, as well as atmospheric gasses entering the permeate side of the chamber through a bleed valve cause a pressure in the chamber to rise. Point "$C_3$" indicates the end of the exhaust phase of cycle "C", and the beginning of an intake phase of a new pump cycle. Each cycle in the example conventional system illustrated in FIG. 1 exhibits a pressure fluctuation of approximately 20 mm Hg. The control system and method of the present invention minimize this pressure fluctuation.

Figure 2:
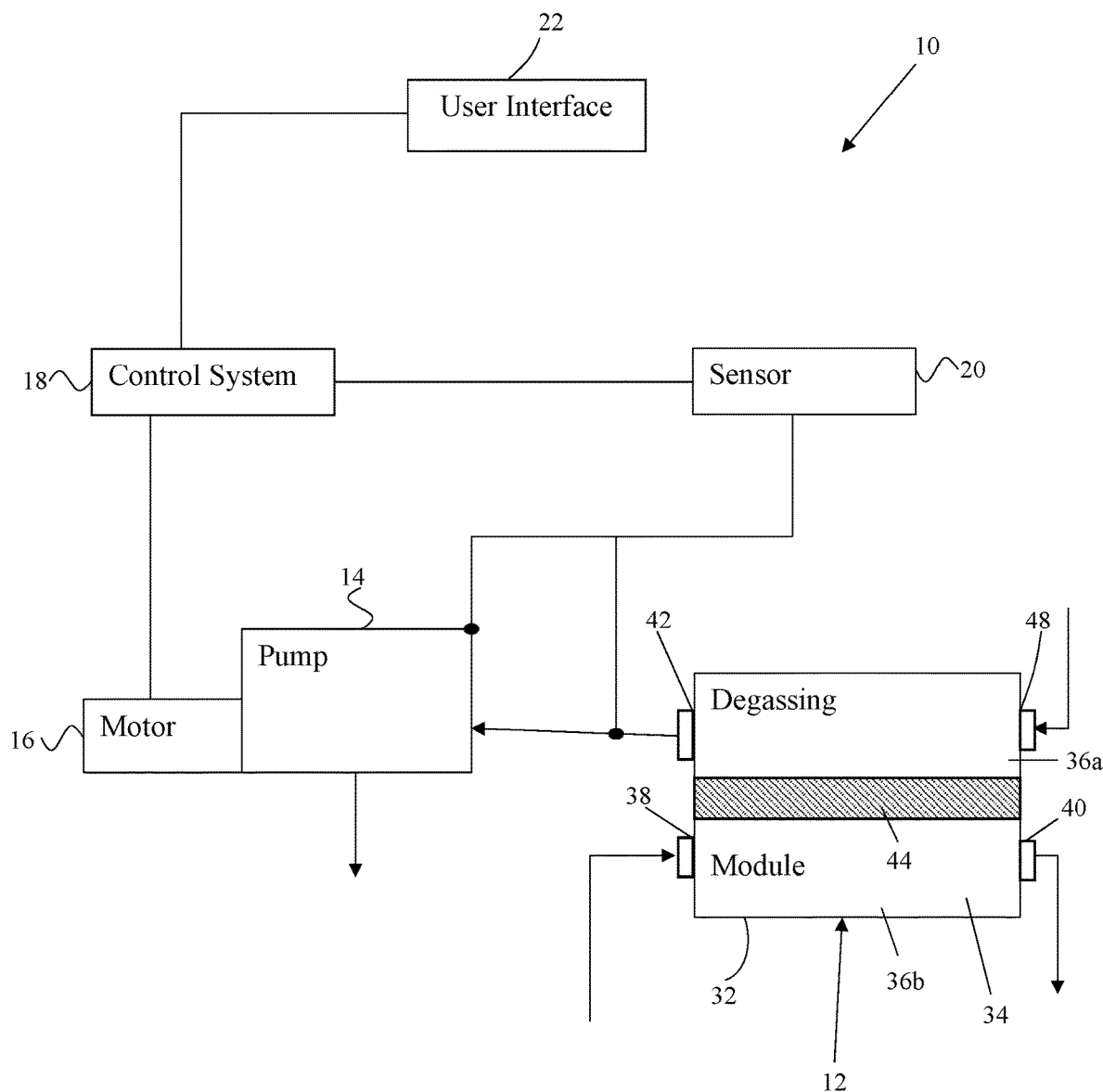
FIG. 2 is a schematic illustration of a fluid degassing system of the present invention.

FIG. 2 schematically illustrates a fluid degassing system 10 of the present invention, including a degassing module 12, a pump 14 driven by a motor 16, and a control system 18 for operating pump 14 through motor 16 in response to a sensed condition, such as a pressure or drive element position sensed by sensor 20.

Degassing module 12 includes a housing 32 defining a chamber 34 having a fluid inlet 38, a fluid outlet 40, and an evacuation port 42. A separation membrane 44 is disposed in chamber 34 and separates chamber 34 into a permeate side 36a and a retentate side 36b. Separation membrane 44 may be any of a variety of semi-permeable membranes effective in separating a gas from a fluid. In some embodiments, separation membrane 44 may be a gas-permeable, liquid-impermeable membrane in a tubular or planar configuration. Other configurations, however, for separation membrane 44 are also contemplated by the present invention. In a particular embodiment, separation membrane 44 may be as described in U.S. Pat. Nos. 9,381,449 and 9,403,121, assigned to the assignee of the present application, and incorporated herein by reference. It is contemplated that the control system and method of the present invention may be particularly useful in relatively low-volume degassing modules 12, such as degassing modules utilized in flat-film separations, wherein permeate-side pressure fluctuations can have significant impact on degassing performance.

Degassing module 12 may assume a variety of configurations, as is known in the art. Example configurations for degassing module 12 include those described in U.S. Pat. No. 10,143,942 and U.S. patent application publication no. US2019/0091609, assigned to the same assignee as in the present application and herein incorporated by reference.

Figure 3:
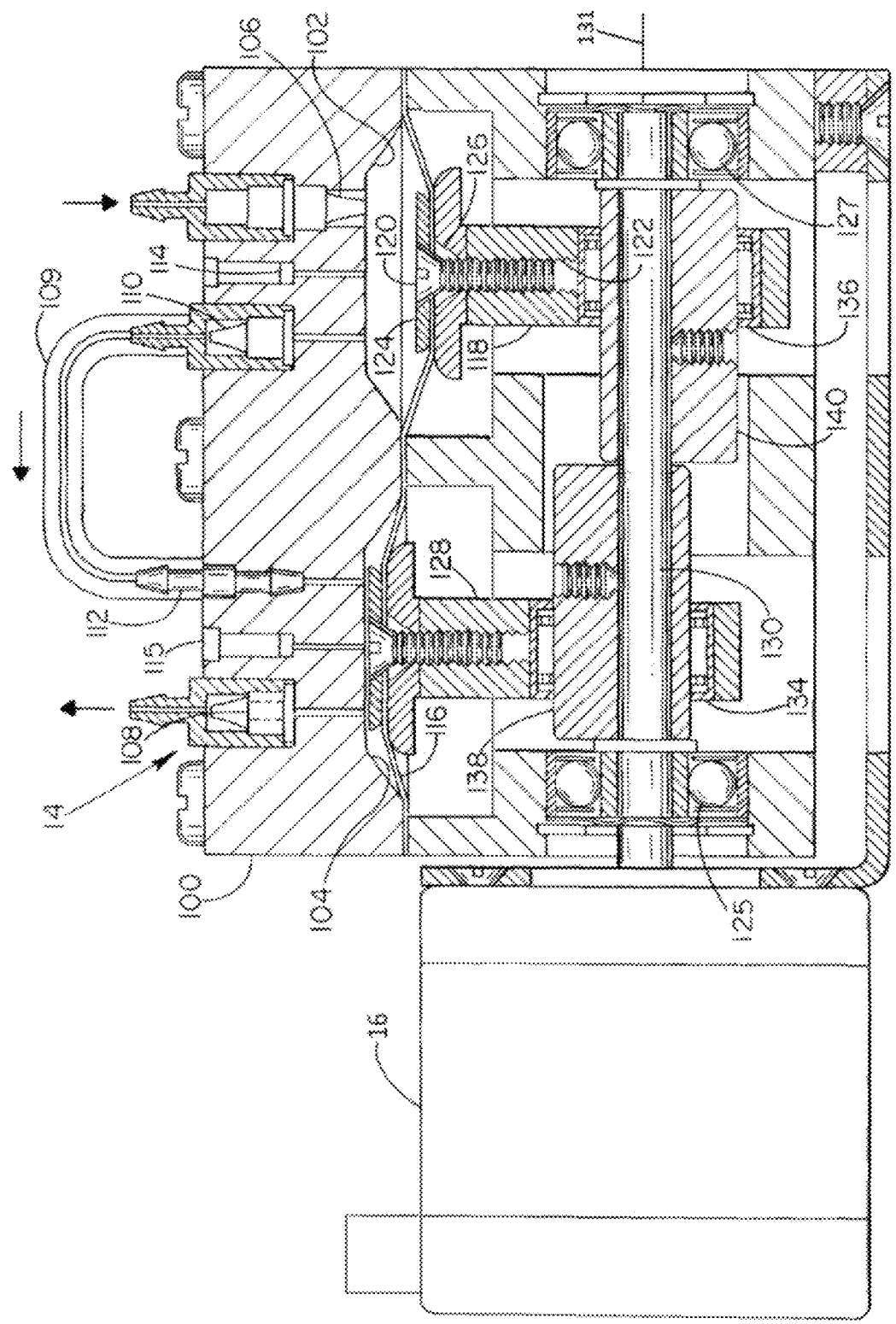
FIG. 3 is a partial cross-sectional illustration of an evacuation pump and motor useful in the fluid degassing system of the present invention.

Pump 14 is fluidically connected to evacuation port 42 of degassing module 12 for evacuating permeate side 36a of chamber 34. An example pump 14 is illustrated in FIG. 3 as a two-stage, series diaphragm pumping mechanism. A manifold 100 includes a first stage head 102 and a second stage head 104. The manifold further includes an intake check valve 106 associated with the first stage and an outlet check valve 108 associated with a second stage. The first and second stages are in fluid flow communication with each other through a tube 109 attached to the first stage through a check valve 110 and attached to the second stage through a barbed fitting 112. A vent frit including a sintered plug 114 may be provided to vent solvent vapors within the first stage. This bleed feature is normally placed in the first stage to prevent the buildup of vapor during the intake stroke and to reduce the exposure of the pump diaphragm to degassed vapors entering the first stage and to thereby prolong the useful life of pump 14. As further described hereinbelow, during the exhaust stroke of the first stage, the second stage is on its intake stroke which ensures very little leakage to the environment.

In the illustrated embodiment, a second vent frit 115 is provided in the second stage of pump 14. The second vent frit 115 is included to vent any residual solvent vapors that may form in the second stage of pump 14, and in particular, at or near outlet check valve 108. As with first vent frit 114, second vent frit 115 is placed in the second stage of pump 14 to provide a bleed function, thereby decreasing detrimental solvent condensation. Use of such vent frits 114, 115 preferably sweeps both first and second stage heads 102, 104 with fresh air to remove solvent condensation while having no major detrimental effect on the vacuum developed within pump 14.

A diaphragm 116 extends from the first stage to the second stage. In the first stage, the diaphragm 116 is affixed to a rod 118 by means of a press fit pin or screw 120 received in a bore 122 formed in the rod 118. A washer 124 and O-ring 126 seal the diaphragm 116 to the rod 118. The diaphragm 116 is affixed to a rod 128 in the second stage in a similar fashion. Diaphragm 116 may be formed from an inert material and tolerant to exposure to solvents and vapors common in chromatographic applications.

Rods 118 and 128 are shown connected to drive element 130 with bearings 134, 136 operably coupled to opposed eccentric portions or cams 138, 140 attached to drive member 130. In this arrangement, rotation of drive member 130 results in reciprocal motion of the first and second rods 118, 128.

Motor 16 may preferably be any variable-speed motor that is responsive to control means and provides for open and/or closed loop control thereof. Specific examples of motor 16 include brushless stepper motors, frequency modulated motors, and pulse width modulated motors. Drive element 130 is driven by motor 16 at a controlled rate. In the illustrated embodiment, drive element 130 is a drive shaft that rotates about axis 131.

Sensor 20 may be configured as necessary to sense one or more conditions of degassing system 10. In some embodiments, sensor 20 is a pressure sensor configured to sense a pressure at permeate side 36a of chamber 34. An example pressure sensor may generate a voltage output that is ratiometric to the pressure level and a supply voltage. Sensor output may be amplified and converted to a pulse width modulated signal that is sent to a processor at control system 18. Sensor 20 may additionally or instead be configured to detect a position of drive element 130, such as a rotational position of a rotatable drive shaft. As will be described in greater detail hereinbelow, the position of the movable drive element 130, such as its rotational position may be linked to a beginning and ending of each of the intake phase and exhaust phase of pump 14. In the case of a multi-stage vacuum pump 14, a beginning and ending of the intake phase and exhaust phase may be linked to the first stage of pump 14. Positional sensors, such as magnetic, electromagnetic, optical, and other known positional sensors may be employed in sensor 20 of degassing system 10. Control system 18 preferably utilizes a sensed condition of degassing system 10 and an input parameter against which the sensed condition is directly or indirectly compared to generate a control signal to motor 16 to thereby adjust a speed of drive element 130, thereby adjusting the rate of evacuation of permeate side 36a of chamber 34. The input parameter may include values such as a set point pressure of permeate side 36a, positions of drive element 130, and performance calibrations as described in U.S. Patent Application Ser. No. 62/772,601, assigned to the present assignee and herein incorporated by reference. The input parameter(s) may be provided to control system 18 in a database accessible to control system 18, or may be provided to control system 18 from a user interface 22, such as a computer. It is contemplated that the input parameter(s) utilized by control system 18 may be updated statically or dynamically, as appropriate.

Control system 18 is preferably programmed to modulate a speed of drive element 130 during at least one of the intake phase and exhaust phase of pump 14. For the purposes hereof, the term "intake phase" is intended to mean that portion of a cycle of pump 14 that acts to draw gas into pump 14 from degassing module 12, or, in the case of a multi-stage pump, into the first stage of pump 14. In some embodiments, the "intake phase" means the portion of a cycle of pump 14 that intakes gas into pump 14, or, in the case of a multi-stage pump, into the first stage of pump 14. For the purposes hereof, the term "exhaust phase" means the portion of a cycle of pump 14 that acts to exhaust gas from pump 14, or, in the case of a multi-stage pump, from the first stage of pump 14. In some embodiments, the "exhaust phase" means the portion of a cycle of pump 14 that exhausts gas from pump 14, or, in the case of a multi-stage pump, from the first stage of pump 14. By way of example with reference to the embodiment of pump 14 illustrated in FIG. 3, an intake phase of pump 14 may be defined as the portion of the pump cycle during which rod 118 descends from its uppermost position adjacent to first stage head 102 to its lowermost position distal from first stage head 102. Likewise, the exhaust phase may be defined as the portion of the pump cycle during which rod 118 ascends from its lowermost position distal from first stage head 102 to its uppermost position adjacent to first stage head 102. In another embodiment, the intake phase may be defined as the portion of the pump cycle between the opening of intake check valve 106 to the closing of inlet check valve 106. Likewise, in some embodiments, the exhaust phase may be defined as the portion of the pump cycle between the opening of outlet check valve 110 to the closing of outlet check valve 110.

Control system 18 is preferably programmed to be capable of independently controlling the intake phase and exhaust phase of each cycle of pump 14, and particularly independently controlling the speed of drive element 130 during at least selected cycles of pump 14. In some embodiments, control system 18 may independently control the speed of drive element 130 during each cycle of pump 14.

Control system 18 may be programmed to modulate a speed of drive element 130 according to a control algorithm including:

$$S_i/S_e<1$$

Wherein:
$S_i$=a drive element average speed during the intake phase; and
$S_e$=a drive element average speed during the exhaust phase.

It has been discovered by the Applicant that pressure levels at permeate side 36*a* of chamber 34 may be more precisely controlled by controlling the speed of drive element 130 during the intake phase, or, in other words, controlling the intake phase time period. In some embodiments, drive element 130 may be controlled to a fixed speed during at least a portion of the intake phase. Drive element 130 may additionally or instead be controlled pursuant to a proportional-integral-derivative (PID) control scheme employing the feedback from sensor 20 of the sensed condition. Other control schemes for modulating the speed of drive element 130 may also or instead be employed by control system 18.

Figure 4:
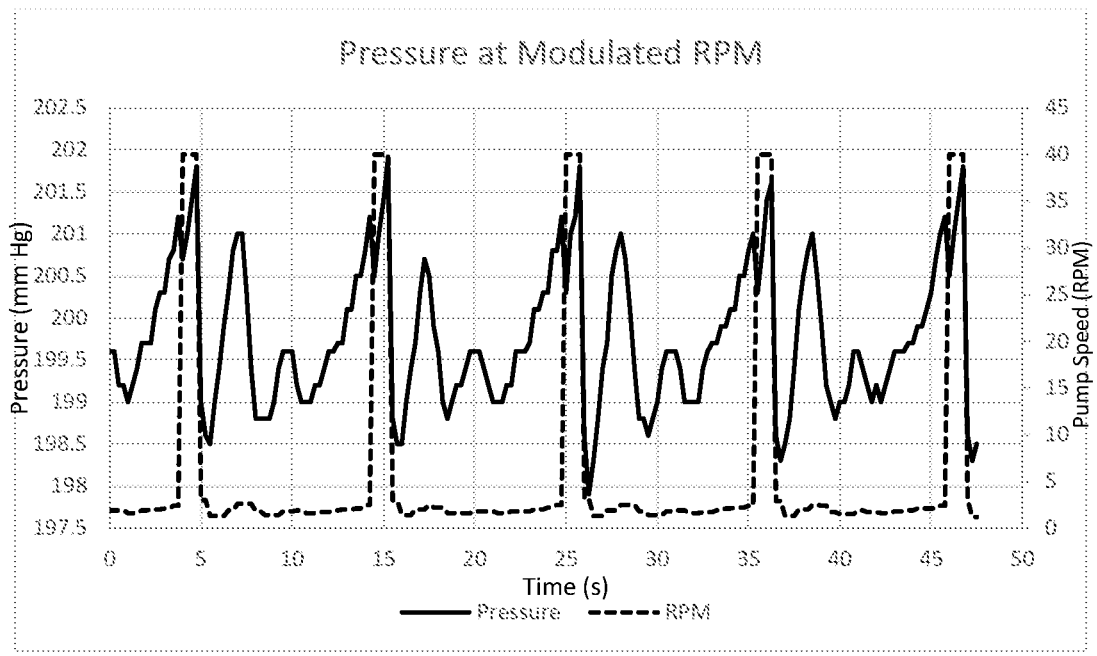
FIG. 4 is a chart illustrating diminished pressure fluctuation in a degassing module under the control of the fluid degassing system of the present invention.
Figure 5:
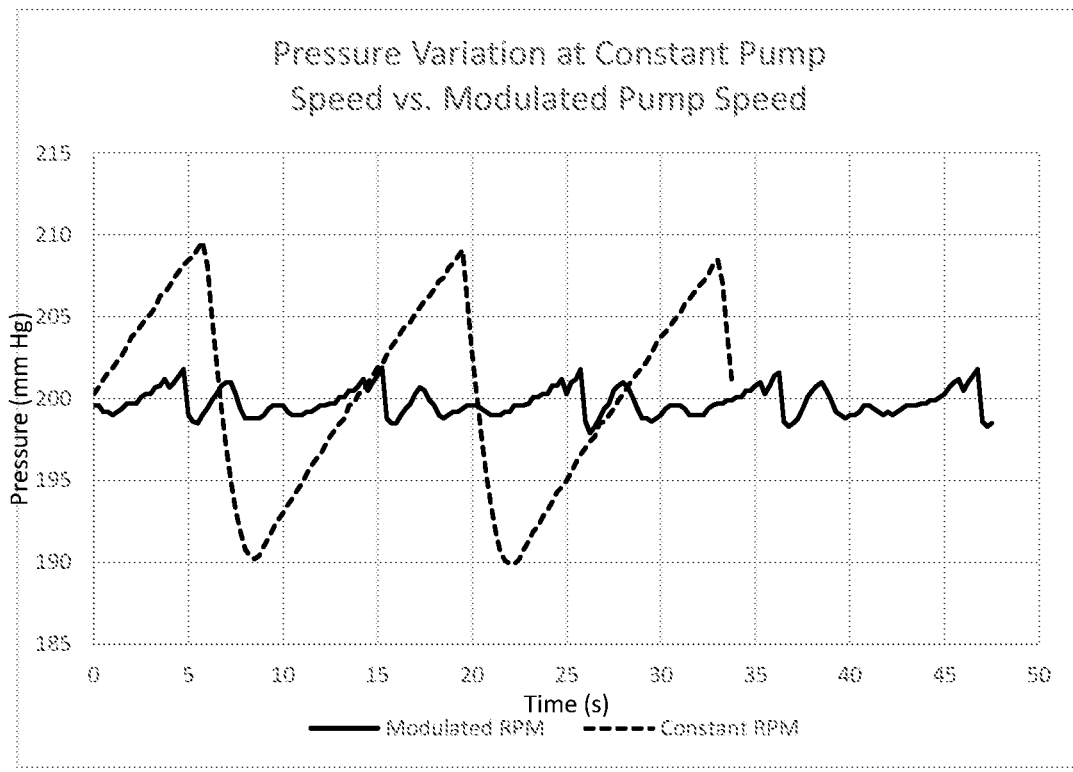
FIG. 5 is a chart illustrating the pressure fluctuations in the scenarios illustrated in FIGS. 1 and 4.

Applicant has discovered that controlling the speed of drive element 130 independently during the intake phase and the exhaust phase of the pump cycle can reduce pressure fluctuations in a degassing chamber. In some embodiments, the average speed of drive element 30 during the intake phase is less than the average speed of drive element 130 during the exhaust phase. The chart of FIG. 4 illustrates an example embodiment of the present invention controlling the drive member speed independently as between the intake phase and the exhaust phase. In this example, drive member 130 is a drive shaft operated under PID control during the intake phase at approximately 2-3 rpm, and switched to operate during the exhaust phase to a fixed rate of 40 rpm. Using such a control scheme, the pressure fluctuation at permeate side 36*a* of chamber 34 is reduced to between about 198 mm Hg and 201.5 mm Hg, for a total fluctuation amplitude of 15 mm Hg. This reduced pressure fluctuation compares favorably to the conventional constant speed control method illustrated in FIG. 1, which resulted in a pressure fluctuation amplitude of nearly 20 mm Hg. The chart of FIG. 5 graphically presents the difference in pressure fluctuation performance between the conventional constant speed control method and the present independent control of the intake phase and exhaust phase of the pump cycle.

In some embodiments, control system 18 of the present invention is programmed to evaluate a sensed pressure at permeate side 36*a* of chamber 34 during one or more complete pump cycles in order to locate the position of drive element 130 where the intake of gas to the pump actually begins and ends. Such drive member positions may be recorded in a database accessible to control system 18, or may instead be determined continuously or semi-continuously. Control to a pressure level may then be accomplished by varying the speed of the drive member 130 per unit time. Further examination of the relationship between the rise and fall of pressure at the permeate side 36*a* of the chamber 34 may be used to dynamically determine the beginning and end of the intake phase, and correspondingly updated at a database of control system 18.

It is contemplated that control system 18 may employ a plurality of pumping conditions to evacuate permeate side 36*a* of chamber 34 in order to maintain various set point pressures. An example first set point pressure may be defined at a level to minimize solvent pervaporation through the separation membrane. The first set point pressure may, in such embodiments, be equal to or greater than a sum of one or more vapor pressures exerted by the one or more constituents of the fluid. Control system 18 may include a second set point pressure that is different than the first set point pressure. For example, the second set point pressure may be less than the sum of the one or more vapor pressures exerted by the one or more constituents of the fluid.

As illustrated in FIG. 2, the fluid may be directed through degassing module 12 to contact separation membrane 44 at retentate side 36*b* of chamber 34, with the fluid flow direction being illustrated by arrows. Degassing module 12 may also include a bleed valve 48 for permitting atmospheric gas or other fluids into permeate side 36*a* of chamber 34 as a means to diminish or prevent solvent condensation at permeate side 36*a* of chamber 34, as well as downstream therefrom.

The invention has been described herein in considerable detail in order to comply with the patent statutes, and to provide those skilled in the art with the information needed to apply the novel principles and to construct and use embodiments of the invention as required. However, it is to be understood that the various modifications can be accomplished without departing from the scope of the invention.

What is claimed is:

1. A method for degassing a fluid, the method comprising:
   (a) providing a degassing system including:
      a module defining a chamber having a fluid inlet, a fluid outlet, and an evacuation port;
      (ii) a gas-permeable, liquid-impermeable membrane disposed in and separating the chamber into a permeate side and a retentate side; and
      (iii) a pump fluidically connected to the evacuation port for evacuating the permeate side of the chamber, the pump including a motor with a drive element that drives the pump through pump cycles to evacuate the permeate side of the chamber, each pump cycle including an intake phase wherein gas is drawn into a first space of the pump and an exhaust phase wherein gas is exhausted from the first space of the pump;
   (b) contacting the membrane with the fluid at the retentate side of the chamber; and
   (c) controlling the pump in a first condition to evacuate the permeate side of the chamber to maintain a first set point pressure by modulating a speed of the drive element according to a control algorithm including:

$$S_i/S_e<1$$

Wherein:
   $S_i$=a drive element average speed during the intake phase of at least one of the pump cycles; and
   $S_e$=a drive element average speed during the exhaust phase of the at least one pump cycle.

2. A method as in claim 1, including modulating the drive element speed to a maximum attainable speed during the exhaust phase.

3. The method as in claim 1, including operating the drive element during the intake phase according to a PID control scheme responsive to a sensed pressure at the permeate side of the chamber.

4. The method as in claim 3, including modulating the drive element speed during the intake phase and the exhaust phase.

5. The method as in claim 3, including operating the drive element speed at a constant rate during the intake phase.

6. The method as in claim 1 wherein the drive element includes a drive shaft that rotates about an axis.

7. The method as in claim 6, including modulating the speed of rotation of the drive shaft about the axis.

8. The method as in claim 7 wherein the pump is a positive-displacement pump with a diaphragm that is reciprocally driven by the drive shaft.

9. The method as in claim 8 wherein the diaphragm reciprocates between the intake phase and the exhaust phase.

10. The method as in claim 7 wherein the pump is a positive-displacement pump with a piston that is reciprocally driven by the drive shaft.

11. The method as in claim 6, including controlling the pump responsive to a sensed rotational position of the drive element.

12. The method as in claim 1, including controlling the pump in a second condition to evacuate the permeate side of the chamber to the first set point pressure.

13. The method as in claim 12, wherein the drive element is driven at a constant speed in the second condition.

14. The method as in claim 1 wherein the fluid comprises one or more constituents each exerting a respective vapor pressure, and the first set point pressure is equal to or greater than a sum of the one or more vapor pressures.

15. The method as in claim 14, including a second set point pressure that is less than the sum of the one or more vapor pressures.

16. A fluid degassing system, comprising:
a chamber having a fluid inlet, a fluid outlet, and an evacuation port;
a gas-permeable, liquid-impermeable membrane disposed in the chamber and separating the chamber into a permeate side and a retentate side;
a pump fluidically connected to the evacuation port for evacuating the permeate side of the chamber, the pump including a motor with a drive element that is configured to drive the pump through pump cycles to evacuate the permeate side of the chamber, each pump cycle including an intake phase wherein gas is drawn into a first space of the pump and an exhaust phase wherein gas is exhausted from the first space of the pump; and
a control system for operating the pump in response to a sensed condition and an input parameter to control a pressure at the permeate side of the chamber, the control system being adapted to modulate a speed of the drive element according to a control algorithm including:

$S_i/S_e<1$

Wherein:
$S_i$=a drive element average speed during the intake phase of at least one of the pump cycles; and
$S_e$=a drive element average speed during the exhaust phase of the at least one pump cycle.

17. The fluid degassing system as in claim 16 wherein the sensed condition includes a sensed pressure at the permeate side of the chamber.

18. The fluid degassing system as in claim 17 wherein the input parameter includes a first set point pressure at the permeate side of the chamber.

19. The fluid degassing system as in claim 16 wherein the drive element includes a drive shaft that rotates about an axis.

20. The fluid degassing system as in claim 19, including modulating the speed of rotation of the drive shaft about the axis.

21. The fluid degassing system as in claim 19 wherein the sensed condition includes a sensed rotational position of the drive element.

22. A fluid degassing system, comprising:
a chamber having a fluid inlet, a fluid outlet, and an evacuation port;
a membrane disposed in the chamber and separating the chamber into a permeate side and a retentate side;
a pump fluidically connected to the evacuation port for evacuating the permeate side of the chamber, the pump including a motor with a drive element that is configured to drive the pump through pump cycles to evacuate the permeate side of the chamber, each pump cycle including an intake phase wherein gas is drawn into a first space of the pump and an exhaust phase wherein gas is exhausted from the first space of the pump; and
a control system for operating the pump in response to a sensed condition indicative of one of the intake phase and the exhaust phase and an input parameter comprising a first set point pressure at the permeate side of the chamber, wherein the control system is adapted to control a pressure at the permeate side of the chamber, the control system controlling each of the intake phase and the exhaust phase independently of one another.

23. The fluid degassing system as in claim 22, including operating the drive element during the intake phase according to a PID control scheme responsive to the sensed condition.

24. The fluid degassing system as in claim 23 wherein the sensed condition includes the pressure.

25. The fluid degassing system as in claim 23 wherein the sensed condition includes a sensed position of a drive element.

* * * * *